United States Patent
Gudell et al.

(10) Patent No.: US 10,469,624 B2
(45) Date of Patent: Nov. 5, 2019

(54) USER INTERFACE CONTROL IN A NETWORKED AUDIO SYSTEM

(71) Applicant: Bose Corporation, Framingham, MA (US)

(72) Inventors: Marc Nicolas Gudell, Milford, MA (US); Rameshwar Sundaresan, Shrewsbury, MA (US)

(73) Assignee: Bose Corporation, Framingham, MA (US)

( * ) Notice: Subject to any disclaimer, the term of this patent is extended or adjusted under 35 U.S.C. 154(b) by 1479 days.

(21) Appl. No.: 14/047,916

(22) Filed: Oct. 7, 2013

(65) Prior Publication Data

US 2015/0100623 A1    Apr. 9, 2015

(51) Int. Cl.
  *H04L 29/06* (2006.01)
  *H04N 21/422* (2011.01)
  (Continued)

(52) U.S. Cl.
  CPC ....... *H04L 67/42* (2013.01); *H04N 21/42207* (2013.01); *H04N 21/431* (2013.01); *H04N 21/43615* (2013.01)

(58) Field of Classification Search
  CPC .................................................. H04L 67/42
  See application file for complete search history.

(56) References Cited

U.S. PATENT DOCUMENTS

| 8,447,284 B1* | 5/2013 | Lee ......................... H04W 4/06 455/3.01 |
| 2007/0180389 A1* | 8/2007 | Holm ................ G06F 17/30058 715/764 |

(Continued)

FOREIGN PATENT DOCUMENTS

| CN | 1582570 A | 2/2005 |
| JP | 2006228127 A | 8/2006 |

OTHER PUBLICATIONS

International Search Report and Written Opinion of the International Searching Authority dated December Dec. 22, 2014 for corresponding PCT Application No. PCT/US2014/059323.

(Continued)

*Primary Examiner* — Moustafa M Meky
*Assistant Examiner* — Sm Z Islam
(74) *Attorney, Agent, or Firm* — Brian M. Dingman; Dingman IP Law, PC (57) ABSTRACT

A method for implementing a user interface (UI) control in a networked audio system that includes a plurality of audio playback devices that are adapted to play audio and that are operatively connected to a network over which audio data is delivered from a digital audio source to the audio playback devices, where the networked audio system further includes a control device that is operatively connected to the network and that has a display that is adapted to display a representation of a UI, and where the control device comprises an operating system (OS) and a native application program written for the control device OS, and memory. There is a local UI program that is stored in the control device memory. The local UI program is loaded in the control device when the native application is opened. The loaded UI is then displayed on the control device display.

20 Claims, 6 Drawing Sheets

(51) Int. Cl.
*H04N 21/431* (2011.01)
*H04N 21/436* (2011.01)

(56) References Cited

U.S. PATENT DOCUMENTS

| | | | | |
|---|---|---|---|---|
| 2009/0119580 | A1* | 5/2009 | Rohrabaugh | G06F 9/4443 715/249 |
| 2009/0268754 | A1* | 10/2009 | Palm | H04L 67/2823 370/466 |
| 2010/0211883 | A1 | 8/2010 | Lee et al. | |
| 2010/0305722 | A1 | 12/2010 | Jin et al. | |
| 2012/0159308 | A1* | 6/2012 | Tseng | G06F 9/4443 715/234 |
| 2013/0174126 | A1* | 7/2013 | Belihomji | G06F 11/3668 717/127 |
| 2013/0246905 | A1* | 9/2013 | Isozaki | G06F 17/2247 715/234 |
| 2014/0225928 | A1* | 8/2014 | Konnola | G06F 17/30899 345/636 |
| 2014/0344845 | A1* | 11/2014 | Luo | G06K 9/00765 725/19 |
| 2014/0344848 | A1* | 11/2014 | Busse | H04N 21/4122 725/28 |

OTHER PUBLICATIONS

Ritchie, Intel Corporation and Thomas Kuehnel, Microsoft Corporation; UPnP AV Architecture: for UPnP Version 1.0; Status: Approved Design Document; Date Jun. 25, 2002; Document Version: 1.00; pp. 1-22.

Allegro Software Development Corporation; Networked Digital Media Standards, A UPnP/DLNA Overview, Oct. 26, 2006; pp. 1-25.

Goosssens, Michael; "XML, a new start for the Web", Academic Training, May 2000, pp. 1-88.

Japanese Office Action dated Jun. 12, 2017 for JP Application No. 2016-520618.

Japanese Office Action dated Dec. 18, 2017 for JP Application No. 2016-520618.

Chinese Office Action dated Mar. 22, 2018 for CN Application No. 201480061905.8 with English Translation.

* cited by examiner

USER INTERFACE CONTROL IN A NETWORKED AUDIO SYSTEM

BACKGROUND

This disclosure relates to a user interface in a networked audio system.

Audio systems can be arranged to stream digital audio data to one or more of multiple audio playback devices that are connected to a network such as a local area network (LAN). Each audio playback device is able to play the audio data through one or more loudspeakers. The system can use computing devices such as PCs, Macs, smartphones and tablets that are loaded with appropriate software, as system control devices that allow the user to log in to an account and control which music is played and which audio playback devices are used to play the music. These control devices may not all use the same operating system (OS).

In order to provide a common user experience across any system control device, it is desirable for all of the control devices to have the same graphical user interface (UI). In order to keep all of the user interfaces (UIs) the same, each time the UI for one OS is modified the UI for all other supported OS have to be modified in the same manner. This takes development time and money. Also, since most updates require user intervention (e.g., acceptance of an update offered by the system), maintaining common UIs across multiple control devices may mean that the user has to take action on each control device.

SUMMARY

It is desirable for the UIs of all control devices for a networked audio system to be the same. For systems that support different operating systems, this can be accomplished by having a common UI program that is stored locally on each control device. A native application (app) written for the OS of the particular control device acts as a wrapper for this local stored UI. The local UI loads when the native app is opened. Accordingly, each device displays the same UI. This arrangement also allows the local UIs to be updated entirely separately from the native app. Updates can be provided without the need for user intervention, except perhaps to approve the update. This scheme maintains common UIs across all system control devices, regardless of the control device OS.

All examples and features mentioned below can be combined in any technically possible way.

In one aspect, a method for implementing a user interface (UI) control in a networked audio system that includes a plurality of audio playback devices that are adapted to play audio and that are operatively connected to a network over which audio data is delivered from a digital audio source to the audio playback devices, where the networked audio system further includes a control device that is operatively connected to the network and that has a display that is adapted to display a representation of a UI, and where the control device comprises an operating system (OS) and a native application program written for the control device OS, and memory, includes providing a local UI program that is stored in the control device memory, loading the local UI program in the control device when the native application is opened, and displaying the UI on the control device display.

Embodiments may include one of the following features, or any combination thereof. The native application can discover the presence on the network of one or more networked audio playback devices. The networked audio playback devices that are discovered may all be associated with a single user account. The networked audio playback devices may be discovered via simple service discovery protocol. The local UI program may establish active communication channels with the discovered networked audio playback devices. The active communication channels may be accomplished using the Websocket protocol. Each discovered networked audio playback device may receive a unique connection with the control device.

Embodiments may include one of the following features, or any combination thereof. The networked audio system may communicate with a web server that has a memory in which updates to the UI program are stored, and the method may further comprise using the UI program to check the web server for updates to the local UI program. The local UI program may further determine the manner in which the local UI program is updated. The local UI program may command the native application to download and install on the control device the updated local UI program. The local UI program may obtain from the web server an identification of all of the audio playback devices on the network.

Embodiments may include one of the following features, or any combination thereof. The web server may also store code for the audio playback devices, and the method may further comprise using the UI program to check the web server for updates to the audio playback device code and arranging for updated code to be delivered from the web server to the audio playback devices. The audio playback device may download from the web server updates to the audio playback device code. The web server may also store code for the native application program, and the method may further comprise using the UI program to check the web server for updates to the native application program. With some updates to the native application program the user may be directed to an application store to retrieve an updated native application program.

Embodiments may include one of the following features, or any combination thereof. The UI program may use scalable vector graphics to render the UI display. The UI program may use web fonts to render the UI display. The local UI program may be independent of screen resolution, and the aspect ratio of the display of the UI may change to match that of the display device of the control device.

In another aspect, a method for implementing a user interface (UI) control in a networked audio system that includes a plurality of audio playback devices that are adapted to play audio and that are operatively connected to a network over which audio data is delivered from a digital audio source to the audio playback devices, where the networked audio system further includes a control device that is operatively connected to the network and that has a display that is adapted to display a representation of a UT, and where the control device comprises an operating system (OS) and a native application program written for the control device OS, and memory, includes providing a local UI program that is stored in the control device memory, loading the local UI program in the control device when the native application is opened, and displaying the UI on the control device display. The native application discovers the presence on the network of one or more networked audio playback devices, wherein the local UI program establishes active communications channels with the discovered networked audio playback devices and wherein each discovered networked audio playback device receives a unique connection with the control device. The networked audio system communicates with a web server that has a memory in which updates to the UI program are stored, and wherein the method further comprises using the UI program to check the web server for updates to the local UI program. The local UI program further determines the manner in which the local UI program is updated and wherein the local UI program commands the native application to download and install on the control device the updated local UI program. The web server also stores code for the audio playback devices, and the UI program is used to check the web server for updates to the audio playback device code and arrange for updated code to be delivered from the web server to the audio playback devices, wherein the audio playback device downloads from the web server updates to the audio playback device code. The web server also stores code for the native application program, and the UI program is used to check the web server for updates to the native application program.

Embodiments may include one of the following features, or any combination thereof. The UI program may use scalable vector graphics and web fonts to render the UI display. The local UI program may be independent of screen resolution. The aspect ratio of the display of the UI may change to match that of the display device of the control device.

DETAILED DESCRIPTION

The networked audio systems described herein are adapted to stream digital audio data to one or more of multiple audio playback devices that are connected to a network such as a wireless local area network (LAN). Each audio playback device is able to play the audio data through one or more loudspeakers. The system uses computing devices such as PCs, Macs, smartphones and tablets that are loaded with appropriate software, as system control devices that allow the user to log in to an account and control which music is played and which audio playback devices are used to play the music. These control devices can support multiple operating systems, for example iOS, Windows and Android. In order to provide a common user experience across all of the system control devices, all of them have the same UI. Using the same UI on two or more (e.g., all) of the system control devices can be accomplished by having a common UI program that is stored locally on each control device. A native application written for the OS of the particular control device acts as a wrapper for this local UI. The local UI loads when the native app is opened. Accordingly, each device displays the same UI. This arrangement also allows the local UIs to be updated entirely separately from the native app. This maintains common UIs across all system control devices, regardless of the control device OS.

Examples of the devices, systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Figure 1:
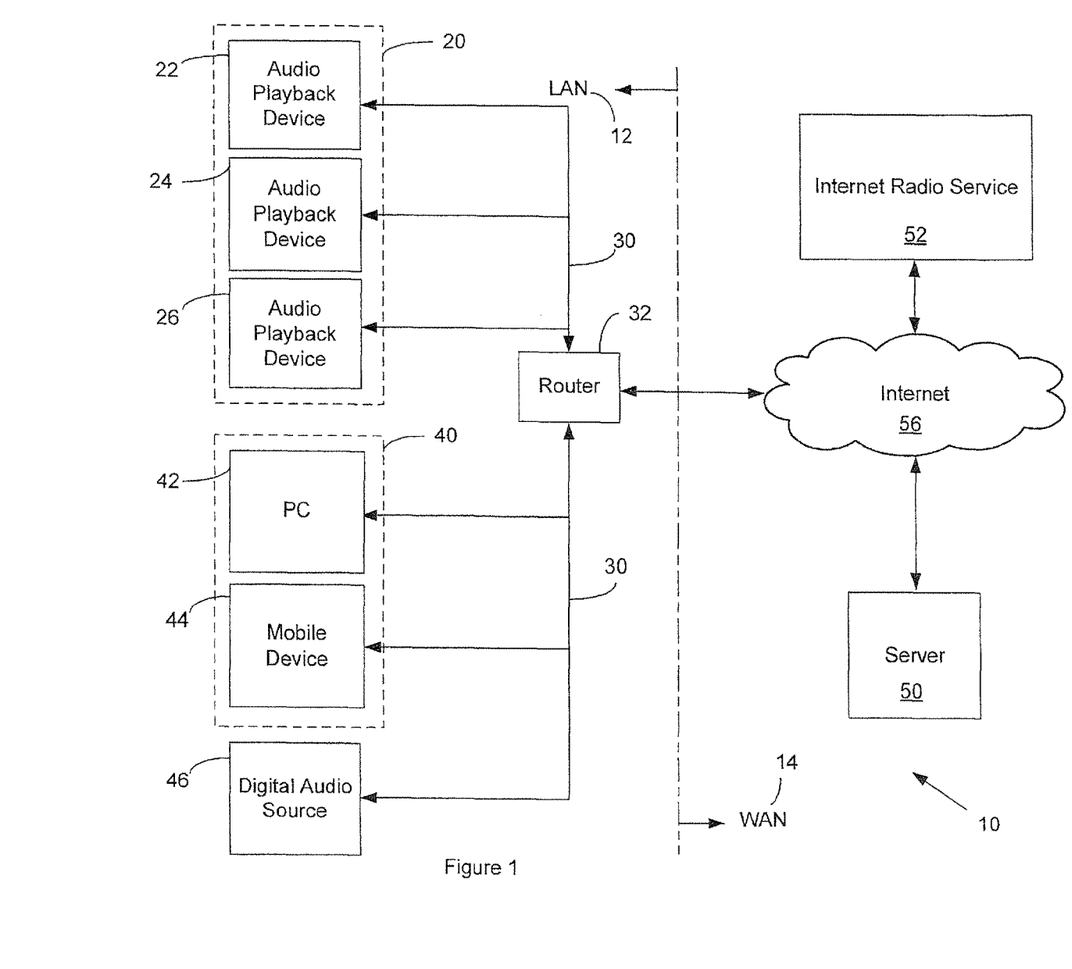
FIG. 1 is a block diagram of a networked audio system

Audio distribution system 10, FIG. 1, can be used to accomplish a method for implementing a UI control in a networked audio system, and also includes the computer devices that are involved in the audio distribution. System 10 is adapted to deliver digital audio (e.g., digital music). System 10 includes a number of audio playback devices 22, 24 and 26 which are among the group of audio output devices 20 of the system. In one non-limiting embodiment, the audio playback devices are identical devices that each include a digital to analog converter that is able to receive digital audio signals and convert them to analog form. The audio playback devices also include an electro-acoustic transducer that receives the analog audio signals and transduces them into sound. The audio playback devices also include a processor. The audio playback devices are connected to one another and also connected to the router/access point 32 via network 30. The audio playback devices are thus able to communicate with one another. Network 30 can be a wired and/or wireless network. Network 30 is part of LAN 12 which is connected to wide area network (WAN) 14, in this non-limiting example by connection to Internet 56. LAN 12 also includes one or more computing devices 40 and one or more local music sources 46. In this non-limiting example the computing devices include a personal computer 42 and a mobile device 44 such as a smart phone, tablet or the like. WAN 14 includes server 50 and Internet radio service 52 which can both communicate with the LAN via Internet 56.

One use of system 10 is to play an audio stream over one or more of the audio playback devices 22, 24 and 26 in group 20. The sources of digital audio provide access to content such as audio streams that move over network 30 to the audio playback devices. The sources of such audio streams can include, for example, Internet radio stations and user defined playlists. Each of such digital audio sources maintains a repository of audio content which can be chosen by the user to be played over one or more of the audio playback devices. Such digital audio sources can include Internet-based music services such as Pandora®, Spotify® and vTuner®, for example. Network attached storage devices such as digital audio source 46, and media server applications such as may be found on a mobile device, can also be sources of audio data. The user may select the audio source and the playback devices via any of control devices 40, such as PC 42 and/or mobile computing device (e.g., smartphone or tablet) 44. The user may also select the audio source and the playback devices via one of the audio playback devices, for example by selection of a preset source, as is further explained below.

The audio playback devices are electronic devices which are capable of rendering (i.e., playing) audio content. These devices can access stored audio content (e.g., remotely stored audio content) and stream it for playback. In some cases, the audio playback devices may also be capable of playing locally stored content. These devices render audio with the help of audio codecs and digital signal processors (DSPs) available within them.

The audio playback devices can communicate with each other. For example, each audio playback device can communicate with the other audio playback devices within the audio system, e.g., for synchronization. This can be a synchronization of device settings, such as synchronization of preset assignments, or, for synchronization of playback (e.g., such that all or a subset of the audio playback devices play the same content simultaneously and synchronously).

The digital audio sources are devices and/or services that provide access to one or more associated entities for supplying content (e.g., audio streams) to the audio playback devices, and which can be located remotely from the audio playback devices. An "entity," as used herein, refers to a grouping or collection of content for playback. Exemplary entities include Internet radio stations and user defined playlists. "Content" is data (e.g., an audio track) for playback. "Associated entity" refers to an entity that is associated with a particular audio source. For example, if the digital audio source is an Internet music service such as Pandora®, an example associated entity would be a radio station provided by Pandora®.

For the purposes of audio system 10, audio streams are considered to be data. They are processed as digital information that is converted to analog before presentation. Data streaming is the method by which data is moved from an audio source to an audio playback device. Typically, there are two models for this data movement, push and pull. The audio system 10 is capable of managing this audio (data) streaming in both fashions; descriptions of these processes are as follows.

In a push model, the digital audio source will move the data to the audio playback device at a pace that it desires. The recipient (e.g., one of the audio playback devices) of the data will acknowledge the data and the digital audio source will provide more data. This model requires the digital audio source to manage the throughput characteristics of the audio system 10. In a pull model, the audio playback device will request data from the digital audio source at a rate it desires. This allows the audio playback device to read ahead if data is available.

The digital audio sources each maintain a repository of audio content which can be chosen by the user to play. The digital audio sources can be based on the Digital Living Network Alliance® (DLNA) or other Web based protocols similar to the Hypertext Transfer Protocol (HTTP). Some of the devices and services in this category include Internet based music services such as Pandora®, Spotify®, and vTuner®; network-attached storage (NAS) devices, and a media server daemon (e.g., provided as a component of a computer-based controller).

The digital audio sources include user defined playlists of digital music files available from network audio sources such as network-attached storage (NAS) devices, and a DLNA server which may be accessible to the audio playback devices over a local area network such as a wireless (Wi-Fi) or wired (Ethernet) home network, as well as Internet radio sites such as Pandora®, vTuner®, Spotify®, etc., which are accessible to the audio playback devices over a wide area network such as the Internet.

The controllers (control devices) are responsible for controlling the audio playback devices and for browsing the audio sources in the audio system. Some of the devices in this controller category include desktop computers, laptop computers, and mobile devices such as smart phones and tablets, any or all of which can be part of computing devices 40. These devices control the audio playback devices via a wireless communication interface (e.g., IEEE 802.11 b/g, Bluetooth LE, infrared, etc.). The controllers serve as an online management tool for a user's network-enabled audio playback devices. The controllers provide interfaces which enable the user to perform one or more of the following: setup a connection to a Wi-Fi network; create an audio system account for the user; sign into a user's audio system account and retrieve information; add or remove an audio playback device on a user's audio system account; setup and control synchronous play by multiple devices; edit an audio playback device's name; update software; access and manage (e.g., add or delete) the audio sources (via the audio playback devices); search sources; assign an entity (e.g., a playlist or radio station) associated with one of the audio sources to a preset indicator; select a preset; browse and select recents, where "recents" refers to recently accessed entities; use transport controls (e.g., play/pause, next/skip, previous, custom source controls such as thumbs up/down, bookmarking); view "Now Playing" (i.e., content currently playing on an audio playback device) and album art; adjust volume levels; and multi-room device setup and control.

In some cases, the controllers may include network controllers and auxiliary controllers. The network controllers are controllers that communicate with the audio playback devices over a wireless (Wi-Fi) network connection. The network controllers can include primary network controllers and secondary network controllers. The primary network controllers can be utilized for: connecting an audio playback device to a Wi-Fi network (via a USB connection between the audio playback device and the primary network controller); creating a system account for the user; setting up music services; browsing of content for playback; setting preset assignments on the audio playback devices; transport control (e.g., play/pause, fast forward/rewind, etc.) for the audio playback devices; and selecting audio playback devices for content playback (e.g., single room playback or synchronized multi-room playback). Devices in the primary network controller category can include desktop and laptop computers.

The secondary network controllers may offer some, but not all, of the functions of the primary network controllers. For example, the secondary network controllers may not provide for all of the account setup and account management functions that are offered by the primary network controllers. The secondary network controllers may be used for: music services setup; browsing of content; setting preset assignments on the audio playback devices; transport control of the audio playback devices; and selecting audio playback devices for content playback: single room or synchronized multi-room playback. Devices in the secondary network controller category can include mobile devices such as smart phones and tablets.

The auxiliary controllers communicate wirelessly (e.g., via Bluetooth low energy (BTLE) or IR) with an associated (e.g., paired) one of the audio playback devices. The auxiliary controllers may offer limited functionality. The auxiliary controllers may be used for: browsing of content; setting of preset assignments on the associated one of the audio playback devices; and transport control (play/pause, etc.) of the associated audio playback device.

Server 50 is a cloud-based server which contains (e.g., within an account database) information related to a user's audio system account. This includes user account information such as the list of the audio playback devices within system 10, device diagnostic information, preset assignments, etc. The server will be connected to by the audio playback devices and by the controllers (e.g., by primary network controllers) for the purpose of preset management, as well as management of audio sources and management of the user's audio system account. The communication between a control device and a web server, and the communication between an audio playback device and a web server, is discussed in more detail below.

The audio playback devices 20 and one or more of the controllers 40 are coupled to a local area network (LAN) 30. Other devices such as one or more of the digital audio sources 46 (e.g., a network-attached storage (NAS) device) may also be coupled to the LAN. The LAN may be a wired network, a wireless network, or a combination thereof. In one example, the devices (e.g., audio playback devices and controllers (e.g., primary and secondary controllers)) within the LAN are wirelessly coupled to the LAN based on an industry standard such as IEEE 802.11 b/g. The LAN may represent a network within a home, an office, or a vehicle. In the case of a residential home, the audio playback devices may be arranged in different rooms (e.g., kitchen, dining room, basement, etc.) within the home. The devices within the LAN connect to a user-supplied access point (e.g., a router) and subsequently to a wide area network (WAN) 14 (e.g., the Internet) for communication with the other digital audio sources (e.g., Internet based music services) and the server.

Figure 2:
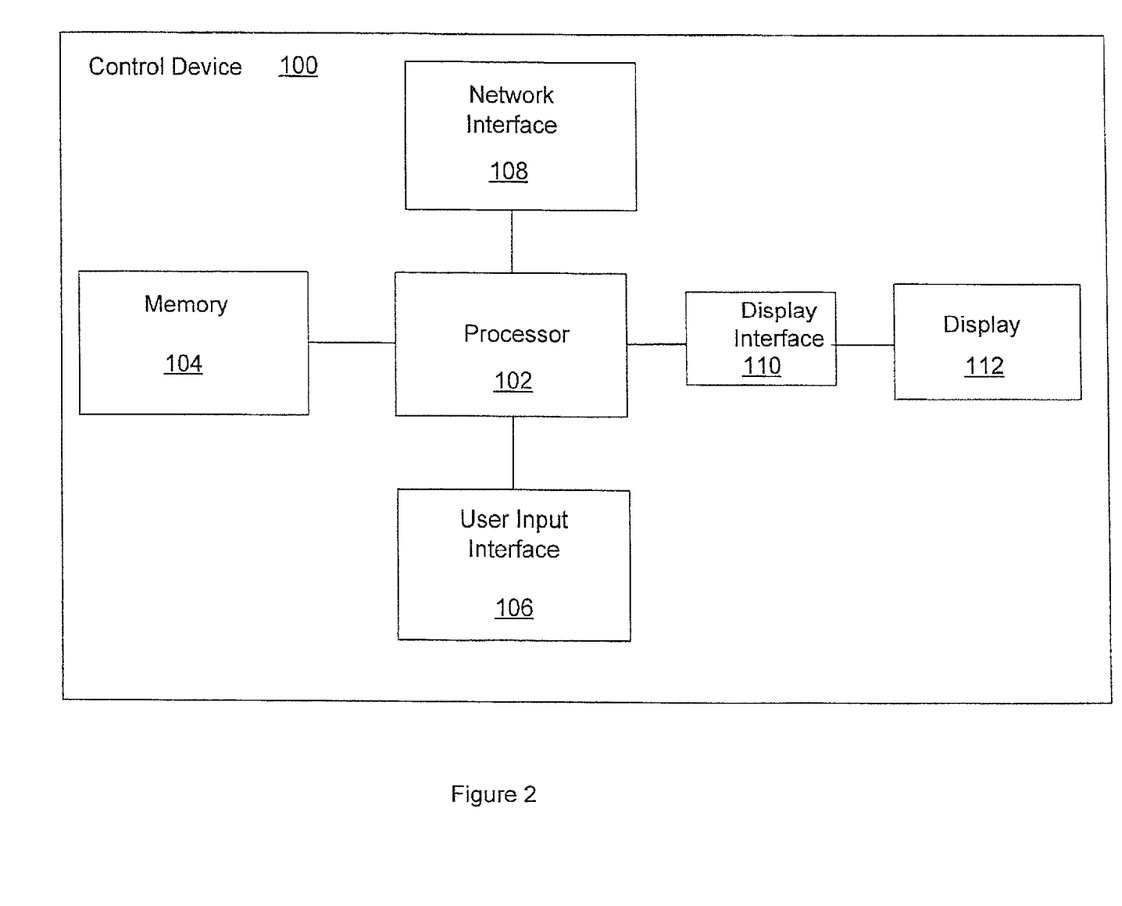
FIG. 2 is a block diagram of an exemplary controller from the audio system of FIG. 1.

Referring to FIG. 2, an exemplary controller (control device) 100 includes a processor 102 that runs the device OS, a memory 104, a display 112 and display interface 100, a user input interface 106, and a network interface 108; device 100 can further include other components as would be apparent to one skilled in the art. Each of the processor 102, the memory 104, the display 112 and display interface 100, and the network interface 108 are interconnected using various buses, and several of the components may be mounted on a common motherboard or in other manners as appropriate.

The processor 102 can execute instructions (e.g., software) within the controller 100, including instructions stored in the memory 104 or in a secondary storage device (not shown). The processor 102 may be implemented as a chipset of chips that include separate and multiple analog and digital processors. The processor 102 may provide, for example, for coordination of other components of the controller 100, such as control of user interfaces, applications run by the controller 100, and network communication by the controller 100. The processor 102 may communication with a user through the display 112 and the user input interface 106. Display interface 110 may be coupled to the display 112. The display 112 may include an LCD monitor, or a touch sensitive display (e.g., in the case of a mobile device). The display interface 110 may comprise appropriate circuitry for driving the display 112 to present graphical information (e.g., a graphical user interface (GUI)) and other information to the user.

The user input interface 106 may include one or more user input devices such as a keyboard, a pointer device such as a mouse, and/or a touch sensitive display. In some cases, the same device (e.g., a touch sensitive display) may be utilized to provide the functions of the display 112 and the user input interface 106.

The network interface 108 facilitates wireless communication (e.g., Wi-Fi, Bluetooth, IR, etc.) with one or more of the audio playback devices (item 20, FIG. 1) via a corresponding network interface that is part of the audio playback device.

The memory 104 stores information within the controller 100. In some implementations, the memory 104 is a volatile memory unit or units. In some implementations, the memory 104 is a non-volatile memory unit or units. The memory 104 may also be another form of computer-readable medium, such as magnetic or optical disk.

Instructions (e.g., software) can be stored in an information carrier. The instructions, when executed by one or more processing devices (e.g., the processor 102), perform one or more processes, such as those described herein. The instructions can also be stored by one or more storage devices such as computer- or machine-readable mediums (for example, the memory 104, a different storage device such as a mass storage device, or memory in the processor 102).

Figure 3:
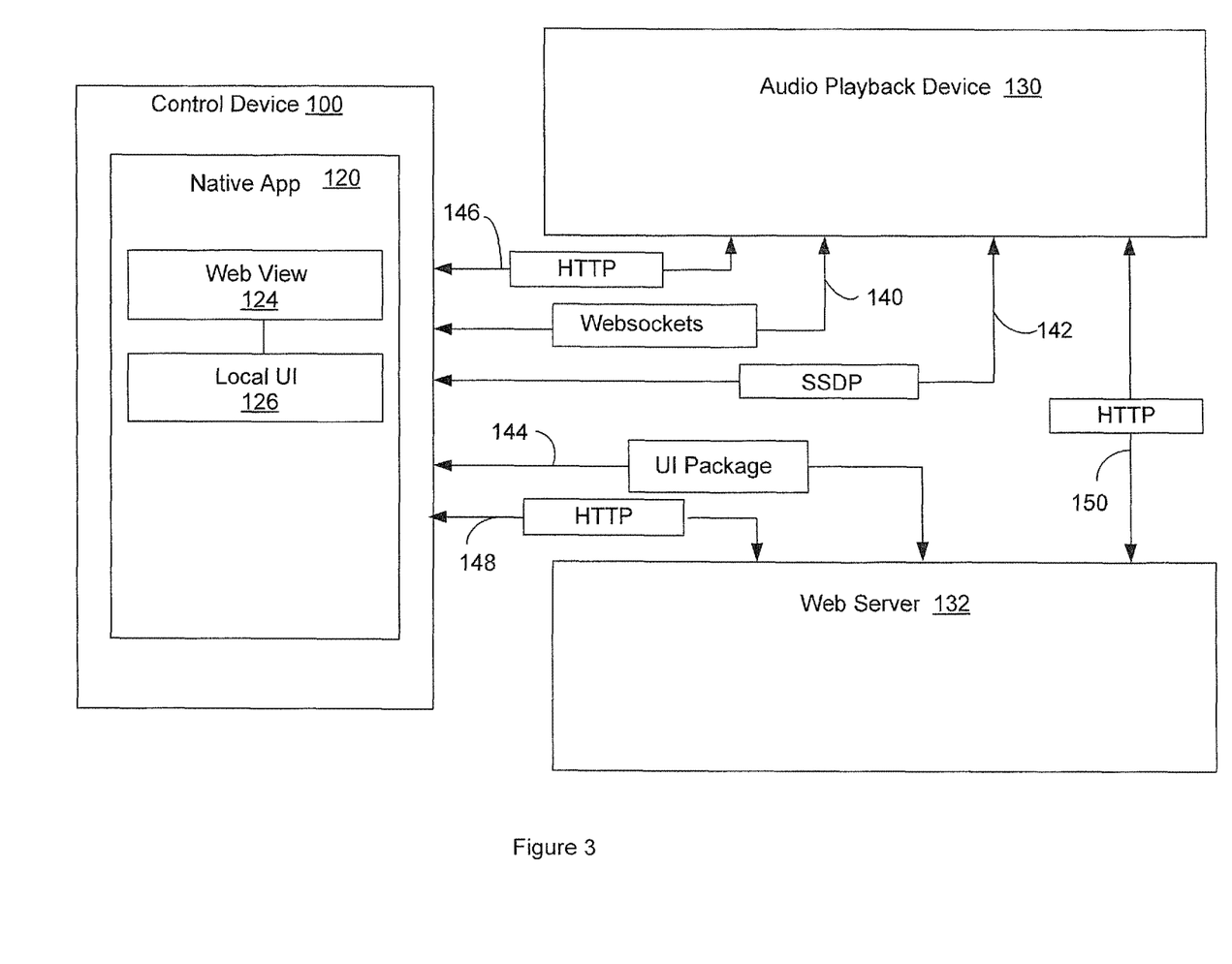
FIG. 3 is a block diagram illustrating inter-device communication in the audio system of FIG. 1.

FIG. 3 is a block diagram illustrating inter-device communication in the audio system of FIG. 1. Control device 100 includes native application program 120, native UI 122, web view (e.g., WebKit) 124 and local (stored) UI 126. Web server 132 (akin to server 50, FIG. 1) and audio playback device 130 are also shown. Native app 120 acts as a wrapper for the local stored UI 126. Native app 120 essentially provides a viewport for the local UI, but makes it appear like the UI is a native program written for the device's OS. There would be an app icon that would be clicked on to open native app 120. The local UI is loaded within the native app, and the local UI is displayed on the device display. The local UI runs in the WebView, which runs in the native app. The native app 120 may also provide some functions like persistent storage of data, information such as screen size and other aspects that the local UI layer may not have access to. The local UI interfaces with the native app via a protocol using JSON over JS interfaces provided by the platforms.

Local UI 126 accomplishes HTTP communication 148 (e.g., via HTTP REST protocol) with web server 132. The local UI reads an xml update file stored in the web server, logs in and out of the account, obtains a list of audio playback devices that belong to the user's account, and can also send some commands that an audio playback device would send directly if the audio playback device is currently off-line (one example being to remove the device from the server). Native app 120 determines if the audio devices are part of a supported audio network and then sends a list of such devices and their addresses to the local UI layer 126. In one non-limiting example the information includes the IP and MAC address of each discovered device. Audio playback device 130 also communicates with web server 150 via HTTP; this communication can relate to updating the device software.

Local UI 126 establishes communications with the audio playback devices. In one implementation it does this using Websockets 140 that are able to establish and maintain active communication channels to all audio playback devices on the network. There is a unique connection with each audio playback device. This provides an ability to push and pull content freely in both directions. In order to establish a Websocket connection, an IP address is needed, which is provided by SSDP (simple service discovery protocol) 142. After the SSDP, HTTP 146 is used to check if the device belongs to the user's account; only after that step is the Websocket connection opened.

The local UI 126 thus essentially acts as a remote control device, or remote display to all hardware systems. Local UI 126 also communicates directly with server 132. It also ties multiple audio playback devices together, so that they can be synched so that they all play the same audio stream.

Local UI 126 is the gatekeeper for updates to the control devices and the audio playback devices, including updates to the native frame, the local UI, and updates of the audio playback device software. Server 132 maintains in its memory an XML file with the latest versions of all software. UI 126 is able to read this (pull model) and determine if an update is available, and determine whether this update is optional or required (based on ecosystem compatibility and optional flags set in the XML file).

The local UI update is handled via this process: the local UI checks XML, UI determines update availability and path, path and command is sent to the native app layer, native layer downloads update package, native layer informs UI layer that update is available, UI informs user of the update via the control device display, once the user agrees (if the update is required the user must agree but cannot reject the update) the UI layer commands the native layer to install the update, the native later unzips and replaces UI files, and the native layer then refreshes the local UI.

Updates to the audio playback device are handled as follows. Updates are part of the web server XML file. When an audio playback device update is available the local UI informs the user (via the device tray or a popup). The update is then communicated from the web server to the audio playback device.

Updates to the native app 120 are presented to the user via the control device. If the device is a PC or a Mae the user is directed to the web server to download a copy of the new software. In the case of iOS and Android the user is directed to an app in the app store or Google Play to download the new native app.

Another aspect of local UI 126 is that it uses vector graphics rather than multiple raster icon sizes for different platforms. This only one set of vector graphics needs to be used for all platforms and screen sizes and resolutions. Web fonts are also used by UI 126 for simpler 'control' or indicator icons. The local UI is independent of screen resolution and scales so it appears similarly on displays of different resolutions. Also, its aspect ratio changes to match that of the display device of the control device.

Figure 4A:
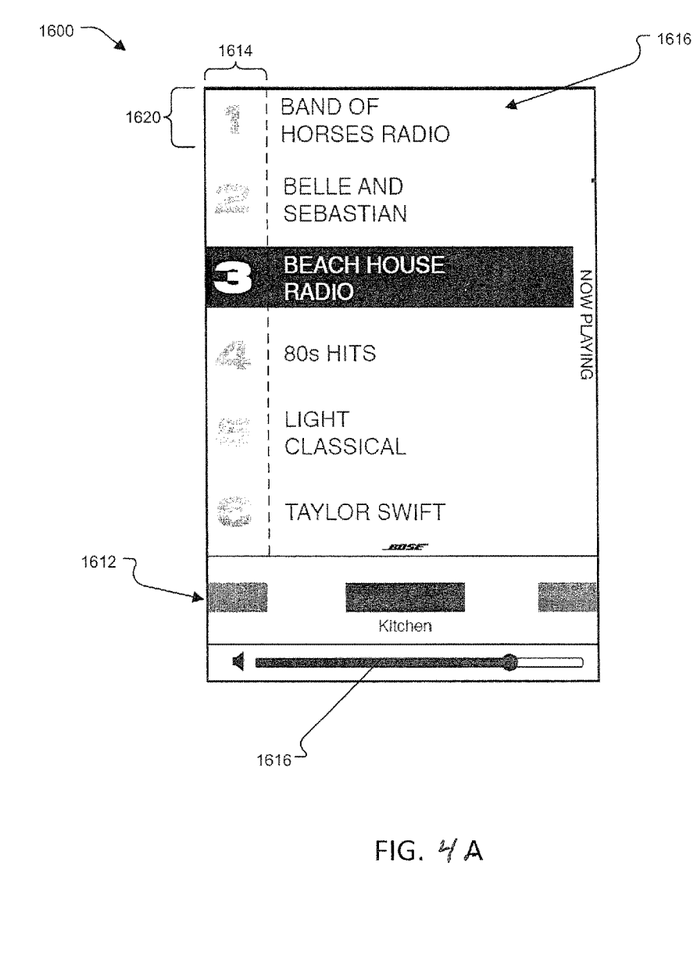
FIGS. 4A, 4B, and 4C show an alternative implementation of a user interface for the main application state in a "Preset" mode, a "Now Playing" mode, and an "Explore" mode, respectively, which may be suitable for a controller in the form of mobile device such as a smart phone.
Figure 4B:
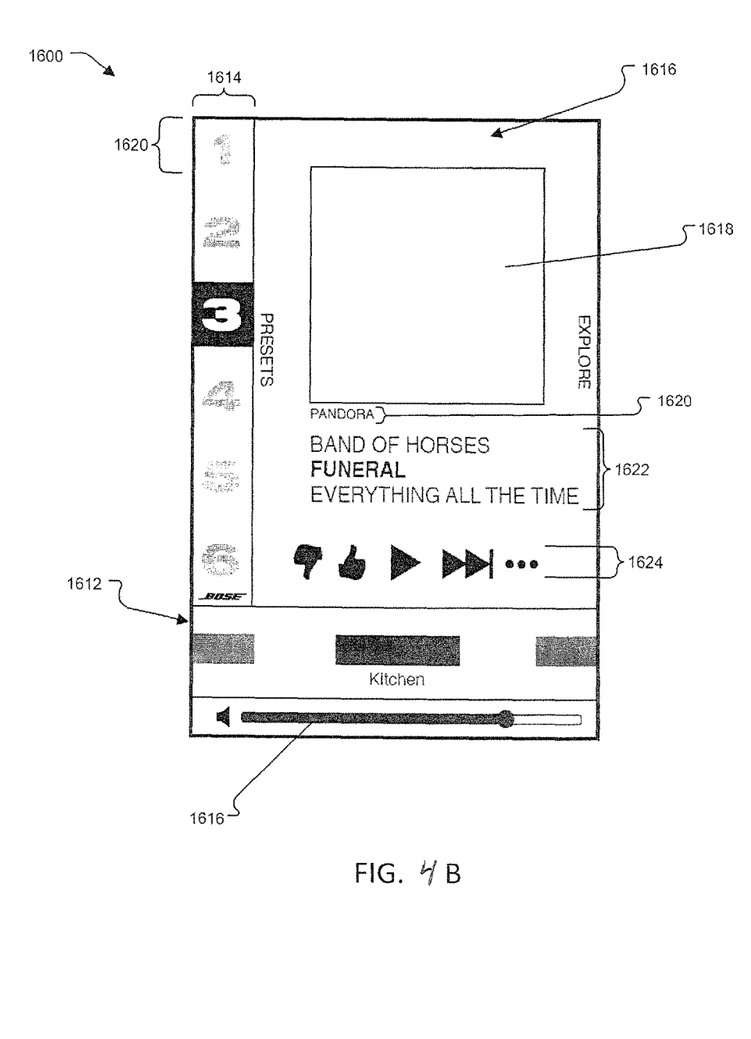
Figure 4C:
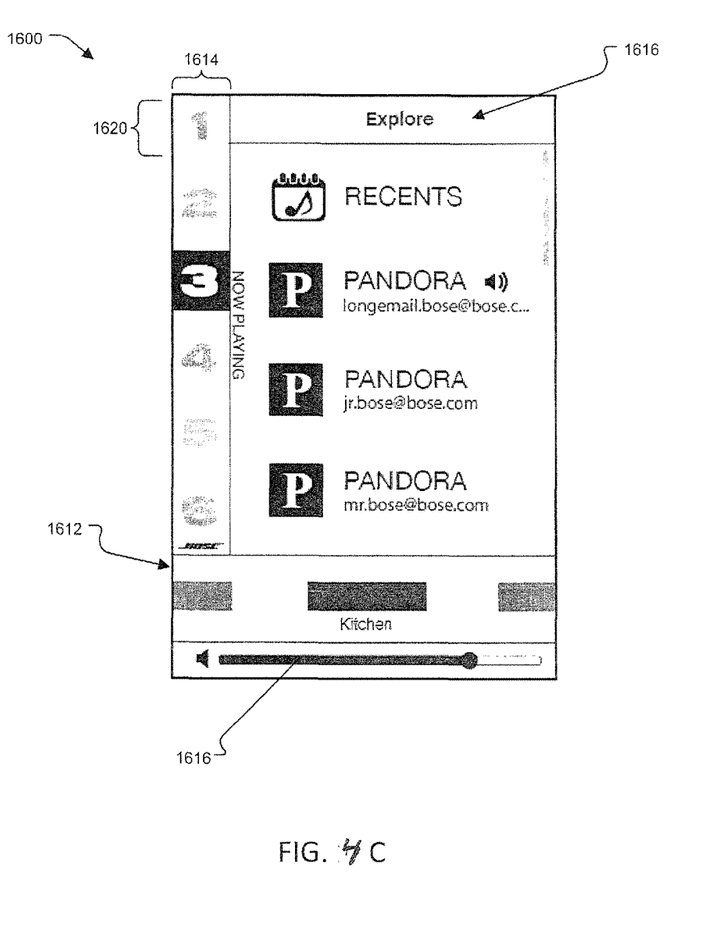

FIGS. 4A through 4C illustrate a non-limiting implementation of a graphical UI 1600 that may be established by the local UIs for mobile control devices such as tablets and smartphones. In the implementation of FIGS. 4A-4C, the main application can be in one of three modes: Presets mode (FIG. 4A), Now Playing mode (FIG. 4B), or Explore mode (FIG. 4C). The user can navigate between Presets, Now Playing, and Explore modes by swiping/navigating left/right amongst these modes.

Referring to FIG. 4A, the user interface 1600 for the main application includes: an audio playback device region 1612, a presets region 1614, and a source region 1616. The audio playback device region 1612 lists audio playback devices on the LAN (item 150, FIG. 1) that are available for control. The user can select the audio playback device(s) from the list of available devices. The Audio playback device region 1612 includes a volume slider 1616 which can be used to control the volume of the selected device.

The presets region 1614 includes a list of (six, in this non-limiting example) preset indicators 1620 (in the form of virtual buttons 1-6) which correspond to the preset indicators 1-6 on the selected audio playback device. The preset indicators are identified by corresponding numerical identifiers for each preset indicator. Users can select a preset (e.g., by double-clicking) so as to play content associated with the selected preset with the selected audio playback device.

The source region 1616 displays the Presets mode, the Now Playing mode, or the Explore mode of the main application. In the Preset mode, shown in FIG. 4A, the source region 1616 displays additional information for the device presets. The additional information can include a description of the corresponding entity assigned to the preset along with a numerical identifier for the preset button.

In the Now Playing mode (FIG. 4B), the source region 1616 displays album art 1618 for content being played by the selected audio playback device. The source region 1616 also includes an identification of the audio source 1620 for the playing content, as well as source specific now playing information 1622 such as Artist Name/Album Name/Track name, or perhaps the station name. In the Now Playing mode, the source region 1616 also includes source specific buttons 1624, which may include transport functions such as play, pause, skip forward, etc. and/or non-transport functions such as thumbs up/down.

The Explore mode (FIG. 4C) allows the user to browse available content and features. In the Explore mode, the source window displays one of a plurality of menus that the user can navigate through to select content to play, to select an entity to assign to a preset, to access Help content, and/or to manage settings.

A top-level Explore list will include links to: available audio sources, recents, help content, and the settings UI state. Audio sources with multiple accounts (e.g., multiple Pandora® accounts all associated with the user's system account) may be listed by date, with the first one set up listed first.

Selection of an audio source opens a sub-list of entities associated with the selected source in the source window. The sub-list of entities is generated via communication between the controller, the selected audio playback device, and the selected audio source as discussed above.

FIG. 4 is but one, non-limiting example of a UI that can be accomplished in the subject system controllers. However it should be understood that the disclosure herein doers not contemplate and is not limited to any particular display or UI. Rather the particular control display can be established based on the needs of the particular networked audio system that uses the controllers.

A number of implementations have been described. Nevertheless, it will be understood that additional modifications may be made without departing from the scope of the inventive concepts described herein, and, accordingly, other embodiments are within the scope of the following claims.

What is claimed is:

1. A method for implementing a graphical user interface (UI) control in a networked audio system that includes a plurality of audio playback devices that are adapted to play audio and that are operatively connected to a network over which audio data is delivered from a digital audio source to the audio playback devices, where the networked audio system further includes a control device that is operatively connected to the network and that has a display that is adapted to display a representation of a UI, and where the control device comprises an operating system (OS) and a native application program written for the control device OS, and memory, the method comprising:

providing a local UI program that is entirely stored in the control device memory, where the local UI program is not written for the control device OS, and where the local UI program causes the control device to display a representation of a user interface;

opening the native application;
loading the local UI program from the control device memory within the native application, but only after the native application has been opened;
where the loaded local UI program causes the control device to display a representation of a user interface;
wherein the control device is configured to establish communications with networked audio playback devices; and
wherein the native application discovers the presence on the network of one or more networked audio playback devices, wherein the local UI program establishes active communication channels with the discovered networked audio playback devices and wherein each discovered networked audio playback device receives a unique connection with the control device.

2. The method of claim 1 wherein the native application discovers the presence on the network of one or more networked audio playback devices.

3. The method of claim 2 wherein the networked audio playback devices that are discovered are all associated with a single user account.

4. The method of claim 2 wherein the networked audio playback devices are discovered via simple service discovery protocol.

5. The method of claim 2 wherein the local UI program establishes active communication channels with the discovered networked audio playback devices.

6. The method of claim 5 wherein the active communication channels are accomplished using the Websocket protocol.

7. The method of claim 5 wherein each discovered networked audio playback device receives a unique connection with the control device.

8. The method of claim 1 wherein the networked audio system communicates with a web server that has a memory in which updates to the local UI program are stored, and wherein the method further comprises using the local UI program to check the web server for updates to the local UI program.

9. The method of claim 8 wherein the local UI program further determines the manner in which the local UI program is updated.

10. The method of claim 9 wherein the local UI program commands the native application to download and install on the control device the updated local UI program.

11. The method of claim 8 wherein the local UI program obtains from the web server an identification of all of the audio playback devices on the network.

12. The method of claim 1 wherein the web server also stores code for the audio playback devices, and wherein the method further comprises using the local UI program to check the web server for updates to the audio playback device code and arrange for updated code to be delivered from the web server to the audio playback devices.

13. The method of claim 12 wherein the audio playback device downloads from the web server updates to the audio playback device code.

14. The method of claim 1 wherein the web server also stores code for the native application program, and wherein the method further comprises using the local UI program to check the web server for updates to the native application program.

15. The method of claim 14 wherein with some updates to the native application program the user is directed to an application store to retrieve an updated native application program.

16. The method of claim 1 wherein the local UI program uses scalable vector graphics to render the UI display.

17. The method of claim 1 wherein the local UI program uses web fonts to render the UI display.

18. The method of claim 1 wherein the local UI program is independent of screen resolution, and the aspect ratio of the display of the UI changes to match that of the display device of the control device.

19. A method for implementing a graphical user interface (UI) control in a networked audio system that includes a plurality of audio playback devices that are adapted to play audio and that are operatively connected to a network over which audio data is delivered from a digital audio source to the audio playback devices, where the networked audio system further includes a control device that is operatively connected to the network and that has a display that is adapted to display a representation of a UI, and where the control device comprises an operating system (OS) and a native application program written for the control device OS, and memory, the method comprising:
providing a local UI program that is entirely stored in the control device memory, where the local UI program is not written for the control device OS, and where the local UI program causes the control device to display a representation of a user interface;
opening the native application;
loading the local UI program from the control device memory within the native application, but only after the native application has been opened;
where the loaded local UI program causes the control device to display a representation of a user interface;
wherein the native application discovers the presence on the network of one or more networked audio playback devices, wherein the local UI program establishes active communication channels with the discovered networked audio playback devices and wherein each discovered networked audio playback device receives a unique connection with the control device;
wherein the networked audio system communicates with a web server that has a memory in which updates to the local UI program are stored, and wherein the method further comprises using the local UI program to check the web server for updates to the local UI program;
wherein the local UI program further determines the manner in which the local UI program is updated and wherein the local UI program commands the native application to download and install on the control device the updated local UI program;
wherein the web server also stores code for the audio playback devices, and wherein the method further comprises using the local UI program to check the web server for updates to the audio playback device code and arranging for updated code to be delivered from the web server to the audio playback devices, wherein the audio playback device downloads from the web server updates to the audio playback device code; and
wherein the web server also stores code for the native application program, and wherein the method further comprises using the local UI program to check the web server for updates to the native application program.

20. The method of claim 19 wherein:
the local UI program uses scalable vector graphics and web fonts to render the UI display;
the local UI program is independent of screen resolution; and the aspect ratio of the display of the UI changes to match that of the display device of the control device.

* * * * *